US009630768B2

(12) United States Patent
Bloc

(10) Patent No.: US 9,630,768 B2
(45) Date of Patent: Apr. 25, 2017

(54) DISPENSING HEAD FOR A SYSTEM FOR DISPENSING A PRODUCT

(71) Applicant: ALBEA LE TREPORT, Le Treport (FR)

(72) Inventor: Richard Bloc, Derchigny-Graincourt (FR)

(73) Assignee: Albea Le Treport, Le Treport (FR)

( * ) Notice: Subject to any disclaimer, the term of this patent is extended or adjusted under 35 U.S.C. 154(b) by 0 days.

(21) Appl. No.: 14/753,244

(22) Filed: Jun. 29, 2015

(65) Prior Publication Data

US 2016/0016722 A1 Jan. 21, 2016

(30) Foreign Application Priority Data

Jul. 17, 2014 (FR) .................................... 14 56850

(51) Int. Cl.

*B65D 88/54* (2006.01)
*G01F 11/00* (2006.01)
*B65D 83/28* (2006.01)
*B05B 11/00* (2006.01)
*B65D 81/24* (2006.01)
*A45D 34/04* (2006.01)

(52) U.S. Cl.

CPC .......... *B65D 83/28* (2013.01); *B05B 11/0005* (2013.01); *B05B 11/3047* (2013.01); *B65D 81/24* (2013.01); *A45D 34/04* (2013.01)

(58) Field of Classification Search

CPC ..... B65D 83/28; B65D 81/24; B05B 11/0005; B05B 11/3047; A45D 34/04; C11D 3/48
USPC ........ 222/320, 394, 402.1, 566, 321.1–321.9
See application file for complete search history.

(56) References Cited

U.S. PATENT DOCUMENTS 4,182,496 A * 1/1980 Burke .................. B05B 1/3436 222/380
5,752,627 A * 5/1998 Vandromme ....... B05B 11/0013 222/137

(Continued)

FOREIGN PATENT DOCUMENTS

EP 1466668 A1 10/2004
EP 2705904 A1 3/2014

(Continued)

OTHER PUBLICATIONS

EP2705904—English Translation; Machine Generated, Apr. 2016.*
French Application 1456850, Search Report, dated Nov. 6, 2014.

*Primary Examiner* — J. Casimer Jacyna
*Assistant Examiner* — Benjamin R Shaw
(74) *Attorney, Agent, or Firm* — Banner & Witcoff, Ltd.

(57) ABSTRACT

The invention relates to a dispensing head for a system for dispensing a product, said head comprising a body which has a well for mounting said head on a tube for the pressurized supply of the product and a recess which is in communication with said well, said recess being provided with an abutment, around which a nozzle is mounted so as to form, at the interface thereof, a path for dispensing the product between said recess and a passage for discharging said product, said head comprising a sheath which is attached around the periphery of the abutment in order to define at least one part of the dispensing path, said sheath being capable of ensuring microbiocidal action on the product contained in said dispensing path.

16 Claims, 2 Drawing Sheets

(56) References Cited

U.S. PATENT DOCUMENTS

| | | | | | |
|---|---|---|---|---|---|
| 6,155,496 | A * | 12/2000 | Brunet | B05B 11/3087 | 222/137 |
| 6,443,370 | B1 * | 9/2002 | Brulle | B05B 1/3436 | 222/321.6 |
| 6,543,703 | B2 * | 4/2003 | Blake | B05B 1/3436 | 239/106 |
| 6,851,583 | B2 * | 2/2005 | Masuzzo | B05B 11/0005 | 222/321.6 |
| 2003/0034362 | A1 * | 2/2003 | Blake | B05B 9/0883 | 222/321.9 |
| 2004/0238573 | A1 * | 12/2004 | Parmentier | B05B 1/3436 | 222/321.1 |
| 2005/0173459 | A1 * | 8/2005 | Buxmann | B05B 11/0032 | 222/321.6 |
| 2006/0213408 | A1 | 9/2006 | Christ | | |
| 2008/0135581 | A1 * | 6/2008 | Kennedy | B05B 11/3009 | 222/205 |
| 2008/0273915 | A1 * | 11/2008 | O'Connell | A45D 34/04 | 401/188 R |
| 2011/0284579 | A1 * | 11/2011 | Pardes | A61F 9/0008 | 222/207 |
| 2012/0199119 | A1 * | 8/2012 | Pardonge | B05B 11/0005 | 128/200.22 |
| 2014/0061251 | A1 * | 3/2014 | Bloc | B05B 11/3047 | 222/321.7 |
| 2014/0299679 | A1 * | 10/2014 | Bloc | B05B 11/0005 | 239/533.12 |

FOREIGN PATENT DOCUMENTS

| | | | | |
|---|---|---|---|---|
| FR | EP 2705904 | A1 * | 3/2014 | B05B 11/3047 |
| JP | H03289476 | A | 12/1991 | |
| WO | WO2013072635 | A1 | 5/2013 | |

* cited by examiner

DISPENSING HEAD FOR A SYSTEM FOR DISPENSING A PRODUCT

CROSS REFERENCE TO RELATED APPLICATIONS

This application claims priority to French Application Serial No. 1456850, filed Jul. 17, 2014, which is hereby incorporated by reference in its entirety.

FIELD

The invention relates to a dispensing head for a system for dispensing a product, to a dispensing system comprising a head of this type which is fixed to a tube for the pressurised supply of the product and to a bottle which is intended to contain a product to be dispensed under pressure by means of such a dispensing system.

In a particular application, the product is of the lotion, gel or cream type, for example for cosmetic use or for pharmaceutical treatments.

BACKGROUND

Dispensing systems are known which comprise a pump which is provided with a tube for the pressurised supply of the product and to which a dispensing head of the push-button type is fixed in order to actuate the movement of said tube over a dispensing stroke and to actuate the suction of the product.

In particular, the dispensing head may comprise a body having a well for mounting said head on the supply tube and a path for dispensing the product between said well and a discharge passage. According to an embodiment, the dispensing path is formed at least in part at the interface between an abutment provided on a recess in the dispensing head and a nozzle which is mounted around said abutment. Therefore, by pressing on the body of the dispensing head, the pump is actuated in order to dispense the product through the discharge passage as a small amount or as a continuous stream.

Throughout the world, various directives aim to regulate, control and limit the presence of substances that are potentially hazardous for human health in products, in particular cosmetic products. One of them is the European REACH (Registration, Evaluation and Authorisation of Chemicals) directive. Thus an environmental trend is driving cosmetics manufacturers to limit or even eliminate from their formulas preservatives that are often the cause of allergies or intolerances.

Cosmetic products are therefore becoming more and more fragile. In particular, it is difficult for them to withstand mechanical or thermal stress (causing for example phase separation) and contact with air (causing for example drying out or oxidation) and they can easily be contaminated by bacteria, yeasts and moulds.

To combat said contamination, formulators attempt to reinforce the intrinsic preservative activity of their products by adding ingredients having a preservative activity, such as certain essential oils, essences of orange, vitamin C, etc. that are not declared as preservatives. They also limit the free activity of water, which they attempt to keep low (AW<0.6) so that bacteria develop to little or no extent. The standard NF 29621 describes means of this type; however, formulators are rapidly approaching the limits of such a strategy.

At the same time, both with regard to the container in which the product is packaged and with regard to the dispensing head, protective bottles are appearing on the market. In particular, the bottles have to prevent microbiological contamination of the product, not only during storage but especially between two uses, and in particular by back-contamination from the discharge passage towards the inside of the container by means of the dispensing path.

In order to do this, complex and expensive dispensing heads have been proposed, the high level of antimicrobial protection of which is not always essential, in particular when the product itself has an intrinsic preservative activity.

SUMMARY

The invention aims to improve the prior art by proposing in particular a dispensing head having a simple design in which the retrieval of the product is ensured while preventing the microbial contamination thereof between two uses, in particular by back-contamination from the discharge passage to the inside of the container.

For this purpose, according to a first aspect, the invention proposes a dispensing head for a system for dispensing a product, said head comprising a body which has a well for mounting said head on a tube for the pressurised supply of the product and a recess which is in communication with said well, said recess being provided with an abutment, around which a nozzle is mounted so as to form, at the interface thereof, a path for dispensing the product between said recess and a passage for discharging said product, said head comprising a sheath which is attached around the periphery of the abutment in order to define at least one part of the dispensing path, said sheath being capable of ensuring microbiocidal action on the product contained in said dispensing path.

According to a second aspect, the invention proposes a system for dispensing a pressurised product, said system comprising a dispensing head of this type and a tube for the pressurised supply of said product, to which tube the well for mounting said head is fixed.

According to a third aspect, the invention proposes a bottle comprising a container in which a product is intended to be packaged, said container being equipped with a dispensing system of this type which is mounted so as to bring the supply tube into communication with said container in order to allow the product to be conveyed from said supply tube to the discharge passage.

BRIEF DESCRIPTION OF THE DRAWINGS

Other objects and advantages of the invention will become apparent in the following description, given with reference to the accompanying drawings, in which.

DETAILED DESCRIPTION

Figure 1:
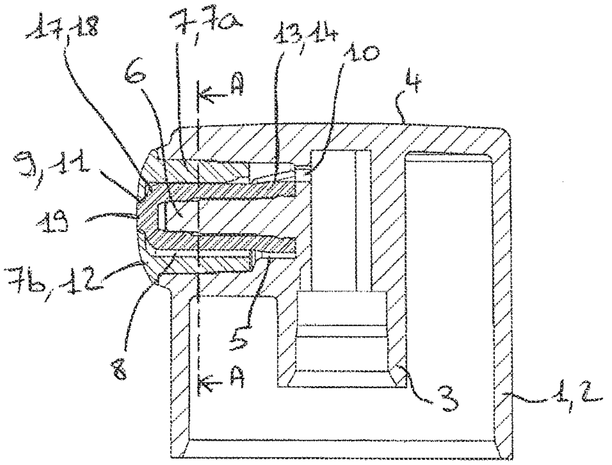
FIG. 1 is a longitudinal section through a dispensing head according to an embodiment, FIG. 1*a* and FIG. 1*b* being a cross section along line A-A and an enlarged view of FIG. 1 respectively.

With reference to the drawings, a dispensing head of the push-button type is described for a system for dispensing a pressurised product, for example as a small amount or as a continuous stream. In one application example, the product is a lotion, a gel or a cream, for cosmetic use or for pharmaceutical treatments.

The dispensing head comprises a body 1 having an annular skirt 2 which surrounds a well 3 for mounting said head on a tube for the pressurised supply of the product. Moreover, the dispensing head comprises an upper region 4 which allows the user to exert pressure on the head using their fingers in order for it to be possible to move said head axially.

The dispensing head is intended to be provided in a dispensing system which comprises an extraction device which is provided with a tube for the pressurised supply of a product to be dispensed, to which tube the well 3 for mounting said head is fixed in a sealed manner in order to allow, by means of axial movement of said head, said tube to move over a dispensing stroke and to actuate the suction of the product.

The extraction device of the dispensing system may comprise a manually actuated pump or, if the product is packaged in a pressurised manner, a manually actuated valve. Therefore, when the dispensing head is moved manually, the pump or the valve is actuated in order to feed pressurised product to the supply tube.

In particular, a manually actuated pump conventionally comprises a body in which means required for pressurising the product to be dispensed are arranged. According to a particular embodiment, the pump is of the type which does not take in air to replace the volume of the dispensed product, so as not to introduce contaminants into the packaged product.

In a known manner, the dispensing system further comprises means, for example a collar, for allowing it to be mounted on the container of a bottle in which a product to be dispensed is intended to be packaged, as well as means for feeding packaged product to the extraction device, for example a dip tube which is arranged in the container or a supply piston which is slidably mounted in the body of said container so as to push the product into said extraction device.

The body 1 also has an annular recess 5 which is in communication with the mounting well 3. In the embodiment shown, the recess 5 has an axis which is perpendicular to that of the mounting well 3 in order to allow the product to be dispensed laterally in relation to the body 1. In a variant which is not shown, the recess may be colinear with the mounting well, in particular for a dispensing head which forms a nasal dispensing insert.

The recess 5 is provided with an abutment 6, around which a nozzle 7 is mounted so as to form, at the interface thereof, a path 8 for dispensing the product between said recess and a passage 9 for discharging the product. In order to do this, the abutment 6 extends from the bottom of the recess 5 while leaving a duct 10 for communication between the well 3 and said recess.

Therefore, by fixing the mounting well 3 to the supply tube, the product is dispensed by pressing on the body 1 in order to actuate the movement of said tube in order to convey the packaged product from the supply tube to the discharge passage 9 of the dispensing path 8.

The dispensing system may also be used for other types of dispensing. In particular, the container of the bottle may comprise a flexible body, pressure thus being applied to the product in the tube by bringing the walls of said container closer together, without using a pump.

In the embodiments shown, the nozzle 7 has a side wall 7*a* which is cylindrical in revolution and is closed towards the front by a distal wall 7*b*.

Furthermore, an opening 11 is made in the distal wall 7*b*, the passage 9 for discharging the product discharging into said opening.

The nozzle 7 is connected to the recess 5 by coupling the outer face of the side wall 7*a*, it being possible for the rear edge of said outer face to also be provided with a radial projection for anchoring the nozzle 7 in said recess. Advantageously, the nozzle 7 and the body 1 of the dispensing head are produced by moulding, in particular from a different thermoplastic material.

In particular, at least the side wall 7*a* of the nozzle 7 may be produced from a material of which the rigidity is greater than the rigidity of the material forming the body 1. Therefore, the high rigidity of the side wall 7*a* makes it possible to prevent it from deforming when it is mounted in the recess 5. Furthermore, the lower rigidity of the body 1 allows for improved sealing between the mounting well 3 and the supply tube.

In an embodiment, the nozzle 7 is based on low-density polyethylene (LDPE), cyclic olefin copolymer (COC), polyoxymethylene or polybutylene terephthalate, and the body 1 is produced from polyolefin.

Between two dispensing actions, some product may remain immobilised in the dispensing path 8, bringing it into contact with the outside air which has potentially been contaminated by bacteria and/or fungi. Therefore, at least the dose which is to be dispensed subsequently may be contaminated by back-diffusion from the discharge passage 9 into the dispensing path 8.

In order to limit this contamination, the dispensing head comprises a sheath 13 which is attached around the periphery of the abutment 6 in order to define at least one part of the dispensing path 8, said sheath being capable of ensuring microbiocidal action on the product contained in the dispensing path 8, in particular by being based on at least one material having microbiocidal properties.

In particular, attaching a sheath 13 having microbiocidal properties in the dispensing path 8 makes it possible to more easily achieve the function of decontamination of the product contained in said path between two dispensing actions, in particular by avoiding limiting the selection of the material forming the body 1 and/or the nozzle 7.

According to an embodiment, the microbiocidal properties of the material are obtained by contact of the product with a microbiostatic agent, for example using a metal material such as a copper or zinc alloy or a material comprising at least one charge of metal particles of this type or one that has undergone surface treatment by fluoridation, galvanising or copper plating.

In particular, the sheath 13 may comprise copper metal which, owing to the microbiostatic properties thereof, prevents the proliferation of or eliminates the contaminants which are in contact with said sheath, without any antimicrobial agents migrating into the product. The use of the sheath 13 therefore makes it possible to localise the use of the copper to the region of the dispensing path 8, without having to copper-plate the body 1 and/or the nozzle 7 and/or charge them with copper particles.

With reference to FIG. 1, the sheath 13 is produced from synthetic material, for example of the polyolefin type and in particular based on polypropylene (PP), of which at least one surface which is intended to define the dispensing path 8 is metallised by a copper deposit.

Figure 2:
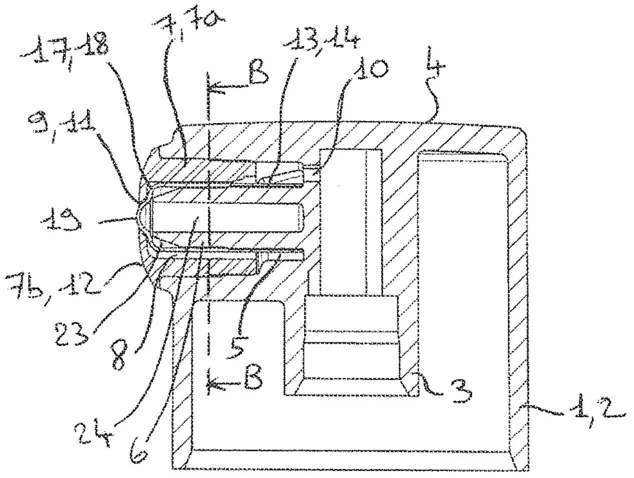
FIG. 2 is a longitudinal section through a dispensing head according to an embodiment, FIG. 2*a* and FIG. 2*b* being a cross section along line B-B and an enlarged view of FIG. 2 respectively.

With reference to FIG. 2, the sheath 13 is produced from copper metal or one of the alloys thereof, for example with zinc, in particular by shaping a sheet by stamping. This solution is advantageous in particular in that it is simple and cost-effective to implement.

In these embodiments, when part of the sheath 13 is visible to the user, it may be provided that the copper is visible on said visible part so that said user can identify the microbiostatic properties of the dispensing system.

According to another embodiment, the sheath 13 is produced from a synthetic material, for example of the polyolefin type and in particular based on polypropylene (PP), said material being charged with particles of copper metal at a charge rate which is sufficient for the particles of copper to be arranged on the surface so as to be in contact with the product.

With reference to the drawings, the dispensing path 8 is in particular defined at the interface between the sheath 13 and at least one wall of the nozzle 7 and/or of the recess 5. As a result, in order to increase the protection against the risk of contamination of the product by bacteria and fungi, at least one of the walls of the nozzle 7 and/or of the recess 5 which defines the dispensing path 8 may also be capable of ensuring microbiocidal action on the product contained in said dispensing path.

In order to do this, the wall in question of the nozzle 7 and/or of the recess 5 defining the dispensing path 8 is produced from at least one material which has microbiocidal properties. In particular, the nozzle 7 and the body 1 may be produced entirely from a material which has microbiocidal properties. According to an embodiment, the nozzle 7 is produced from the same type of material as that described above in relation to the design of the sheath 13.

Advantageously, the outer surface 12 of the distal wall 7*b* is also capable of ensuring a microbiocidal function in order to prevent contamination due to soiling on said surface between two dispensing actions, thus ensuring that the product which is subsequently dispensed is not contaminated by said soiling. In the same way, the peripheral surface defining the opening 11 may also be capable of ensuring a microbiocidal function, since the product contained in the discharge passage 9 between two dispensing actions is also in contact with the air.

The microbiocidal properties of the material can be obtained by diffusing an antimicrobial agent in the product, for example an agent having an organic base such as Trichlosan (a trade name of the company Melcoplast) or having a silver or mineral base. In particular, the material may comprise at least one polyolefin, for example polyethylene (PE), in particular low-density polyethylene (LDPE), polypropylene (PP) and/or polystyrene, which is charged with at least one antimicrobial agent.

The microbiocidal properties of the material may also be obtained by irradiating the product with radiation having a suitable wavelength, in particular by means of a material that has photoluminescent properties after exposure to outside light. In particular, the material may be based on at least one polyolefin, for example low-density polyethylene (LDPE), said polyolefin being charged with at least one additive which is capable of emitting photoluminescent radiation which has a wavelength of between 250 and 260 nanometers, and in particular of 254 nanometers, which corresponds to the order of magnitude of sterilising ultraviolet radiation.

In the embodiments shown, the sheath 13 has a cylindrical coupling 14 which is mounted in a sealed manner around the periphery of the abutment 6, said cylindrical coupling being arranged so as to be radially opposite the side wall 7*a* to form therebetween at least one central part 8*a* of the dispensing path 8.

Advantageously, the spacing between the sheath 13 and the side wall 7*a* depends on the viscosity of the product and the sensitivity thereof to microbial contamination, said spacing for example being between 0.2 mm and 1 mm, in particular being less than 0.3 mm.

Thus, by reducing the amount thereof, it is possible to ensure reliable and rapid decontamination of the product contained in the central part 8*a* of the dispensing path 8 between two dispensing actions. In particular, the microbiocidal action on the product contained in the dispensing path 8 is designed to be quicker than the microbial proliferation towards the container, thus stopping the progress thereof.

Figure 1A:
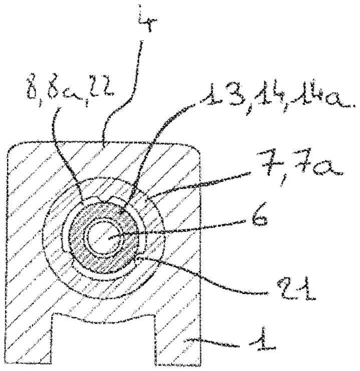
Figure 1B:
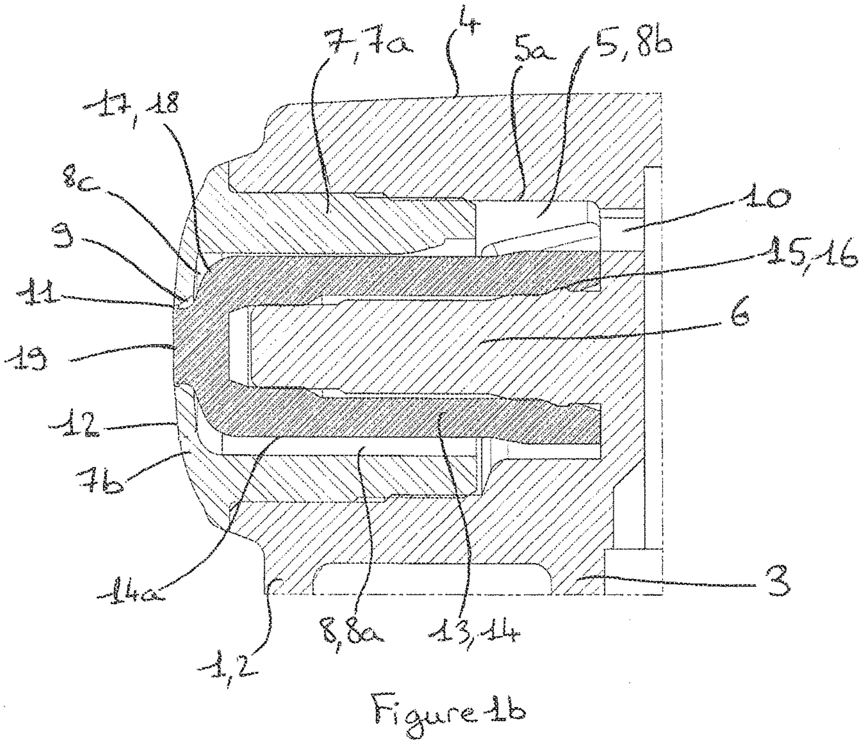
Figure 2A:
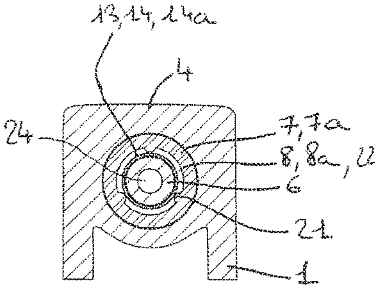
Figure 2B:
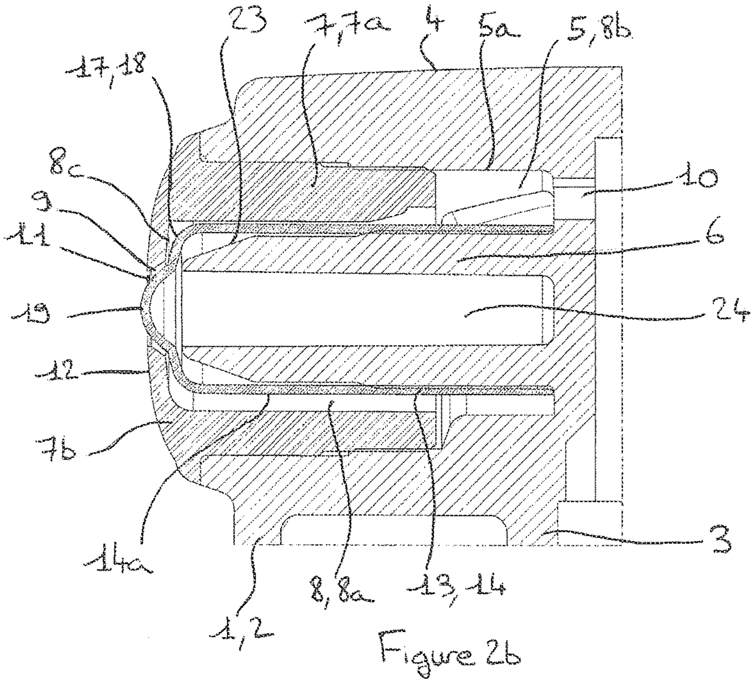

With reference to FIGS. 1*a* and 2*a*, the side wall 7*a* comprises three axial projections 21 which are uniformly distributed over the inner face thereof, each projection 21 having a free wall which is arranged on the outer surface 14*a* of the cylindrical coupling 14 in order to ensure that the nozzle 7 is centered relative to the sheath 13. In particular, the projections 21 define three axial conduits 22 therebetween which form the central part 8*a* of the dispensing path 8.

With reference to FIG. 1, the cylindrical coupling 14 is attached by snapping a projection 15 which is borne by the periphery of the abutment 6 into a channel 16 which is formed on the inner face of said cylindrical coupling. Moreover, the cylindrical coupling 14 is in tight contact around the abutment 6 in order to ensure sealing at the interface thereof.

With reference to FIG. 2, the cylindrical coupling 14 is coupled to the periphery of the abutment 6. In order to do this, the abutment 6 has a chamfer 23 which is formed on the front end thereof. Moreover, the abutment 6 has a hole 24 which extends axially over at least part of the length thereof, such that the coupling of said sheath to said abutment leads to a deformation of said abutment, which makes it possible to increase the reliability of the attachment of said sheath to said abutment by spring-back of said abutment in said sheath.

In the embodiments shown, the cylindrical coupling 14 covers the periphery of the abutment 6, such that the entire periphery is isolated from the product passing through the dispensing path 8. Furthermore, the dispensing path 8 has an upstream part 8*b* which is formed between the cylindrical coupling 14 and a side wall 5*a* of the recess 5.

Downstream, the sheath 13 has a cover 17 which closes the distal end of the cylindrical coupling 14, said cover being arranged so as to be axially opposite the distal wall 7*b* so as to form the passage 9 for discharging the product at the interface between the opening 11 and said cover. In particular, at least the distal wall 7*b* of the nozzle 7 is produced from rigid material in order to define the geometry of the discharge passage 9.

The discharge passage 9 may have a maximum dimension which is less than or equal to 0.5 mm, in order to limit the maximum distance separating the product contained in said passage from the wall(s) having microbiocidal action which defines said passage. Therefore, by a surface effect on a very thin film of product, it is ensured that the product contained in the discharge passage 9 is decontaminated.

In addition, the reduced dimensions of the discharge passage 9 make it possible to limit the extent to which the product contained in the dispensing path 8 dries out between two dispensing actions.

According to an embodiment, at least the distal wall 7*b* of the nozzle 7 is produced from flexible material, for example based on a thermoplastic elastomer (TPE) and/or a silicone, in order to be reversibly deformable by the product exerting pressure thereon between a resting state in which the discharge passage 9 is open and a stressed expansion state of said passage.

In particular, the distal wall 7*b* is arranged so not to be in contact with the cover 17 in the resting state, in order to prevent it from adhering to said cover and to prevent product from being ejected with force when the discharge passage 9 expands.

With reference to the drawings, the cover 17 has a front ring 18 which is arranged so as to be axially opposite the distal wall 7*b* to form therebetween at least one downstream part 8*c* of the dispensing path 8, as well as a projection 19 which is arranged at least in part in the opening 11 in order to form the discharge passage 9 between the respectively outer and inner peripheral walls of said projection and said opening.

The volume of the downstream part 8*c* may be less than 0.1 $mm^3$, in order to ensure that the product contained in said volume is decontaminated by contact with the ring 18. Moreover, the reduced dimensions of the downstream part 8*c* make it possible to limit the extent to which the product contained in the dispensing path 8 dries out between two dispensing actions.

The invention claimed is:

1. Dispensing head for a system for dispensing a product, said head comprising a body which has a well for mounting said head on a tube for the pressurised supply of the product and a recess which is in communication with said well, said recess being provided with an abutment, around which a nozzle is mounted so as to form, in the space separating said nozzle and said abutment, a path for dispensing the product between said recess and a passage for discharging said product, said head being characterised in that it comprises a sheath which is attached around the periphery of the abutment in order to define at least one part of the dispensing path, said sheath being based on at least one material having microbiocidal properties; wherein the sheath has a cylindrical coupling which is mounted in a sealed manner around the periphery of the abutment, said cylindrical coupling being arranged so as to be radially opposite a side wall of the nozzle to form therebetween at least one central part of the dispensing path.

2. Dispensing head according to claim 1, characterised in that the nozzle has a distal wall in which an opening is formed, the discharge passage being formed at the interface between said opening and a cover of the sheath.

3. Dispensing head according to claim 2, characterised in that at least the distal wall is reversibly deformable by the product exerting pressure thereon, between a resting state in which the discharge passage is open and a stressed expansion state of said passage.

4. Dispensing head according to claim 2, characterised in that the cover has a projection which is arranged at least in part in the opening in order to form the discharge passage between the respectively outer and inner peripheral walls of said projection and said opening.

5. Dispensing head according to claim 2, characterised in that the cover has a front ring which is arranged so as to be axially opposite the distal wall to form therebetween at least one downstream part of the dispensing path.

6. Dispensing head according to claim 1, characterised in that the discharge passage has a maximum dimension which is less than or equal to 0.5 mm.

7. Dispensing head according to claim 1, characterised in that the cylindrical coupling covers the periphery of the abutment, the dispensing path having an upstream part which is formed between said cylindrical coupling and a side wall of the recess.

8. Dispensing head according to claim 1, characterised in that the dispensing path is defined by a wall of the nozzle and/or of the recess, said wall being capable of ensuring microbiocidal action on the product contained in said dispensing path.

9. Dispensing head according to claim 8, characterised in that the sheath and said wall are produced from at least one material having microbiocidal properties by diffusion of an antimicrobial agent, by contact with a microbiostatic agent and/or by irradiation with radiation having a suitable wavelength.

10. Dispensing head according to claim 9, characterised in that the sheath and/or the nozzle comprises copper metal.

11. Dispensing head according to claim 10, characterised in that the sheath and/or the nozzle is produced from a synthetic material, of which at least one surface which is intended to define the dispensing path is metallised by a copper deposit.

12. Dispensing head according to claim 10, characterised in that the sheath and/or the nozzle is produced from copper metal.

13. Dispensing head according to claim 10, characterised in that the sheath and/or the nozzle is produced from a synthetic material which is charged with particles of copper metal.

14. Dispensing head according to claim 3, characterised in that the cover has a projection which is arranged at least in part in the opening in order to form the discharge passage between the respectively outer and inner peripheral walls of said projection and said opening.

15. Dispensing head according to claim 3, characterised in that the cover has a front ring which is arranged so as to be axially opposite the distal wall to form therebetween at least one downstream part of the dispensing path.

16. Dispensing head according to claim 4, characterised in that the cover has a front ring which is arranged so as to be axially opposite the distal wall to form therebetween at least one downstream part of the dispensing path.

* * * * *